| United States Patent | [15] | 3,706,743 |
| Moon | [45] | Dec. 19, 1972 |

[54] 1,2-PYRIDAZINEDICARBOX-IMIDOPHOSPHOROUS INSECTICIDES

[72] Inventor: Malcolm W. Moon, Kalamazoo, Mich.

[73] Assignee: The Upjohn Company, Kalamazoo, Mich.

[22] Filed: Oct. 16, 1970

[21] Appl. No.: 81,524

[52] U.S. Cl. .................. 260/250 A, 424/250
[51] Int. Cl. ............................. C07d 51/04
[58] Field of Search ..................... 260/250 A

[56] References Cited

UNITED STATES PATENTS 3,528,978   9/1970   Moon ..................... 260/250 A

Primary Examiner—Nicholas S. Rizzo
Attorney—John Kekich and Willard L. Cheesman

[57] ABSTRACT

This invention pertains to new organic chemical compounds, the process for preparing the same, and a new method and compositions for controlling invertebrate pests. The invention is more particularly directed to new pesticidally active 1,2-pyridazinedicarboximides characterized by an organic phosphorus group attached to the imide nitrogen, new N-hydroxyalkyl-1,2-pyridazinedicarboximide intermediates, new N-haloalkyl-1,2-pyridazinedicarboximide intermediates, new 4- and/or 5-alkylsubstituted-1,2-pyridazinedicaboximide intermediates, a process for preparing the foregoing new compound, a new method and compositions for controlling invertebrate pests, and a new process for cyclizing dicarboxamides to obtain corresponding dicarboximides, particularly 1,2-pyridazinedicarboximides.

19 Claims, No Drawings

1,2-PYRIDAZINEDICARBOXIMIDOPHOSPHOROUS INSECTICIDES

BRIEF SUMMARY OF THE INVENTION

The new pesticidally active 1,2-pyridazinedicarboximides characterized by an organic phosphorus group attached to the imide nitrogen have the following general structural formulas

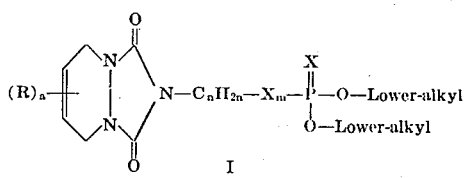

and

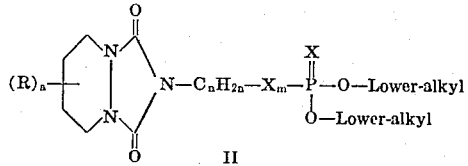

wherein R is lower-alkyl; $a$ is an integer from zero to four, inclusive; $n$ is an integer from zero to four, inclusive; $m$ is zero or one; and X is an oxygen or sulfur atom, provided that $m$ is one when $n$ is other than zero.

The new N-hydroxyalkyl-1,2-pyridazinedicarboximide intermediates of this invention have the following general structural formulas:

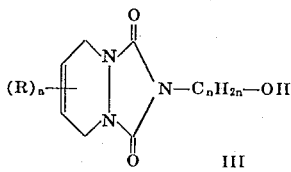

and

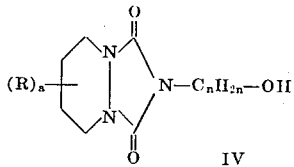

wherein $-C_nH_{2n}-$ is a straight chain or branched alkylene group of from one to four carbon atoms, inclusive, R and $a$ are as already defined.

The new N-haloalkyl-1,2-pyridazinedicarboximide intermediates of this invention have the following general structural formula

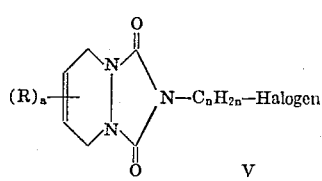

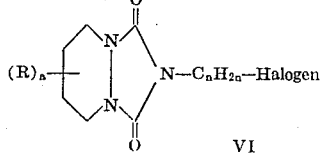

wherein R, $a$, and "$C_nH_{2n}$" are as defined, and halogen is preferably chlorine or bromine, but includes iodine and fluorine.

The new 4- and/or 5-alkylsubstituted-1,2-pyridazinedicarboximide intermediates of this invention have the following general structural formulas:

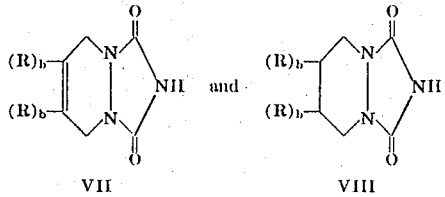

wherein R is as already defined, and $b$ is zero or one provided that there is at least one alkyl group in the 4- or 5-position.

The ultimate O,O-dilower-alkyl 1,2-pyridazinedicarboximidophosphorous compounds of this invention (Compounds of Formulas I and II) are prepared from a variety of 1,2-pyridazinedicarboximide intermediates, and there are various methods of preparing the ultimate compounds. The primary intermediates are 3,6-dihydro-1,2-pyridazinedicarboximides and 3,4,5,6-tetrahydro-1,2-pyridazinedicarboximides having the general structural Formulas:

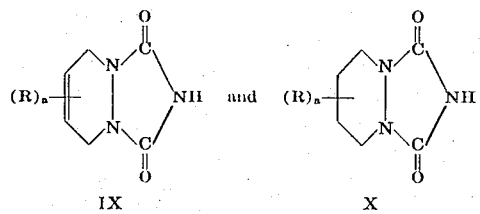

wherein R and $a$ are as defined.

The 1,2-pyridazinedicarboximide intermediates of Formulas IX and X when converted into their corresponding alkali metal salts react with organic phosphorous compounds to give some of the compounds of Formulas I and II directly. Other compounds of Formulas I and II are prepared through the N-hydroxyalkyl and N-haloalkyl intermediates of Formulas III, IV, V, and VI.

The primary intermediates 3,6-dihydro-1,2-pyridazinedicarboximides of Formula IX are obtained by internal cyclization of a 3,6-dihydro-1,2-pyridazinedicarboxamide of the formula

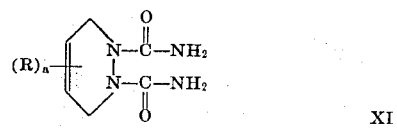

wherein R and $a$ are as defined.

The internal cyclization can be effected according to a known method or according to the new method of this invention. Accoding to the known method, a 3,6-dihydro-1,2-pyridazinedicarboxamide is heated to a temperature in the range of 275° to 285° C. as described in U.S. Pat No. 2,813,865. At this temperature range, the amido groups become reactive, a decomposition reaction occurs which splits out a molecule of ammonia, the carbonyl carbons become joined through the remaining nitrogen atom, and the corresponding 3,6-dihydro-1,2-pyridazinedicarboximide results.

According to the new process of this invention the cyclic imide formation is preferably achieved by heating the 1,2-pyridazinedicarboxamide in aqueous alkali metal hydroxide solution. An equimolar amount of sodium hydroxide or potassium hydroxide is used when the 1,2-pyridazine-dicarboxamide has been purified, but even a crude mixture of the diamide will react to give the desired imide. An excess (e.g., five equivalents) of alkali metal hydroxide can be used if desired, because the imide product is stable in basic solutions. Temperatures in the range of about 50 °C. to about 100° C. or slightly higher can be used. This reaction is advantageous, because the 1,2-pyridazinedicarboximide product precipitates on acidification of the reaction solution in high yields and can be readily recovered in pure form by filtration.

In order to obtain the primary intermediates 3,4,5,6-tetrahydro-1,2-pyridazinedicarboximides of Formula X, a 3,6-dihydro-1,2-pyridazinedicarboximide of Formula IX is reduced at the 4,5-double bond. The desired reduction is accomplished by any of the conventional methods for reducing carbon to carbon double bonds (see Example 5, Part A for specific preparation).

Reduction can be accomplished, for example, using hydrogen in the presence of a metal catalyst. Advantageously, the reduction is effected with hydrogen in the presence of a noble metal catalyst, for example platinum, palladium, rhodium and the like; although base metal catalysts can be used, for example, Raney nickel, Raney cobalt, and the like can be used.

In general, satisfactory hydrogenations are accomplished using the following conditions: (1) hydrogen gas under about 15 lbs. to about 50 to 60 lbs. pressure, (2) the catalyst, (preferably palladium), (3) temperatures in the range of about 10° C. to about 100° C. (preferably about 25° C.), and (4) a solvent, advantageously, dilute aqueous sodium hydroxide. In general, the hydrogenation proceeds readily and is essentially completed in about 15 mins. to about 3 hrs. when, for example, palladium catalyst, hydrogen pressures of about 45 to 60 lbs., and a temperature of about 25° C. are employed.

The 3,4,5,6-tetrahydro-1,2-pyridazinedicarboximide product is recovered from the hydrogenation reaction mixture by conventional methods, e.g., filtration to remove the catalyst, concentration, and acidification. The product can be isolated in pure form by crystallization from a suitable solvent, e.g., ethanol; by partition between two immiscible solvents; by chromatography; or by a combination of these purification techniques.

U.S. Pat. No. 2,813,867 describes how to prepare 3- and 6-lower-alkylsubstituted-3,6-dihydro-1,2-pyridazine-dicarboxamide starting compounds ("1,2-dicarbamyl-1,2,3,6-tetrahydropyridazine") by reacting an alkadiene with azodicarboxamide. Preparation of 4- and 5-lower-alkylsubstituted 3,6-dihydro-1,2-pyridazinedicarboxamides are not described or suggested.

It has been found that 4- and/or 5-lower-alkyl-substituted-3,6-dihydro-1,2-pyridazinedicarboxamides according to Formula XI can be prepared by reacting azodicarboxamide with a 2- or 3-lower-alkylsubstituted-1,3-butadiene. The reaction proceeds under the same conditions as described in U. S. Pat. No 2,813,867, and representative 2- or 3-lower-alkylsubstituted-1,3-butadienes include 2,3-dimethylbutadiene, 2-ethyl-1,3-butadiene, and isoprene.

The new N-haloalkyl-1,2-pyridazinedicarboximide intermediates of this invention (Compounds according to Formulas V and VI) are obtained by halogenating an N-hydroxyalkyl-1,2-pyridazinedicarboximide intermediate of Formulas III or IV according to this invention. The halogenation is accomplished using conventional methods, e.g., using thionyl chloride or bromide or using phosphorous pentachloride, phosphorous tribromide, phosphorous triiodide. The corresponding fluoride can be made by halogen exchange, for example, reacting a N-chloroalkyl-1,2-pyridazinedicarboximide with silver fluoride (AgF).

The new N-hydroxyalkyl-1,2-pyridazinedicarboximide intermediates are prepared according to known methods. Those wherein the "alkylene" group is methylene are prepared by heating and condensing a 3,6-dihydro- or 3,4,5,6-tetrahydro-1,2-pyridazinedicarboximide with aqueous formaldehyde in the presence of catalytic amounts of sodium hydroxide. The N-hydroxymethyl-3,6-dihydro-(or 3,4,5,6-tetrahydro)-1,2-pyridazinedicarboximide product is recovered and purified by conventional methods such as solvent extraction, solvent evaporation, cooling to promote precipitation or crystallization, filtration, and recrystallization.

The N-hydroxyalkyl-1,2-pyridazinedicarboximides of Formulas III and IV wherein "alkylene" is ethylene, propylene, or butylene are prepared by reacting a halogenated alcohol e.g., ethylene bromohydrin, 3-bromopropyl alcohol or 4-bromobutyl alcohol, respectively, with a sodium or potassium salt of the imide. Corresponding "alkylene" groups wherein the carbon chain is branched are prepared by using halogenated alcohols isomeric with those enumerated above, e.g., 2-chloro-1-butanol, 1-chloro-2-butanol, 3-chloro-2-butanol, 4-chloro-2-butanol, and propylene chlorohydrin.

The N-(2- or 3-hydroxyalkyl)-1,2-pyridazinedicarboxi-mides according to Formulas III and IV can also be prepared by reacting the imide with a haloketone of the Formula

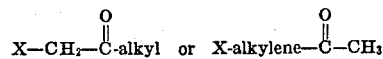

wherein "alkyl" is of from one to two carbon atoms and "alkylene" is —CH$_2$— or —CH$_2$—CH$_2$—to obtain the corresponding N-(2- or 3-keto-alkyl)-1,2-pyridazinedicarboximide which is then reduced using known methods to give the corresponding N-(2- or 3-hydroxyalkyl)-1,2-pyridazinedicarboximide.

There are still other methods for preparing N-hydroxyalkyl-1,2-pyridazinedicarboximide of Formulas III and IV by using, for example, propylene oxide, 1,2-butylene oxide, β-butylene oxide and like reactants.

DETAILED DESCRIPTION

The following examples describe the manner and process of making and using the invention and set forth the best mode contemplated by the inventor of carrying out his invention, but are not to be construed as limiting the scope thereof.

EXAMPLE 1

Preparation of 0,0-diethyl 3,6-dihydro-1,2-pyridazinedicarboximido)phosphonothionate

PART A 3,6-Dihydro-1,2-pyridazinedicarboximide

A reaction mixture, prepared by slowly adding 240 g. (6.0 moles) sodium hydroxide to a suspension of 510 g. (3.0 moles) 3,6-dihydro-1,2-pyridazinedicarboxamide in 2 l. water, was heated in a steam bath for 2 hrs. The reaction mixture was then cooled to 0° C. and filtered. The filtrate was acidified with concentrated hydrochloric acid, and the precipitate that formed was collected on a filter. After washing the filter cake with water and drying there was obtained 340 g. (75 percent yield) of 3,6-dihydro-1,2-pyridazine dicarboximide having a melting point of 238° to 241° C.

PART B 0,0-Diethyl (3,6-dihydro-1,2-pyridazinedicarboximido)-phosphonothioate A reaction mixture prepared by mixing 50 g. (0.285 mole) sodium 3,6-dihydro-1,2-pyridazinedicarboximide and 54 g. (0.285 mole) diethyl chlorothiophosphate in 95 ml. N-methyl-pyrrolidone was shaken at about 25° C. for 18 hrs. The reaction mixture (a solution) was then transferred to a separatory funnel, and the reaction vessel rinsed with 400 ml. benzene and 800 ml. water, and the rinsings were added to the mixture. After the benzene (and aqueous) layers had formed, the benzene layer was removed, and the aqueous layer extracted with three 200 ml. portions benzene. The original benzene layer and the three extractions were combined, washed with two 200 ml. portions dilute aqueous sodium hydroxide (1N), washed with three 800 ml. portions water, and dried. After removing the benzene by evaporation, the residual oil was dissolved in 5 ml. ether. The ether solution was cooled to -10° C. and the crystals that formed were collected on a filter. Recrystallization from ether gave 0,0-diethyl-(3,6-dihydro-1,2-pyridazinedicarboximido) phosphonothioate having a melting point of 62° to 65° C.

Analysis
Calcd. for $C_{10}H_{16}N_3O_4PS$:
C, 39.34; H, 5.28; N, 13.76; P, 10.15; S, 10.50.
Found: C, 39.43; H, 5.52; N, 13.78; P, 10.45; S, 10.75.

EXAMPLE 2

Preparation of 0,0-diethyl (3,6-dihydro-1,2-pyridazinedicarboximido)phosphonate

A reaction mixture was prepared by adding 2.96 g. (55 millimoles) sodium methoxide to a solution of 7.66 g. (50 millimoles) 3,6-dihydro-1,2-pyridazinedicarboximide in a mixture of 100 ml. benzene and 10 ml. methanol. This reaction mixture was heated at the boiling point until about 45 ml. of the benzene:methanol had been removed. The remaining solvent was removed by distillation under reduced pressure. The residue was then suspended in 100 ml. benzene and 9.40 g. (54.5 mmoles) diethyl phosphorochloridate dissolved in 50 ml. benzene was added. After stirring this reaction mixture overnight, the solids that had separated were collected on a filter. The filtrate was evaporated to dryness and the residue was set aside at −15° C. The solids were then combined and triturated with 50 ml. ether. There was thus obtained 8.40 g. (58 percent yield) of 0,0-diethyl-(3,6-dihydro-1,2-pyridazinedicarboximido)phosphonate having a melting point of 68° to 69° C.

Analysis
Calcd. for $C_{10}H_{16}N_3O_5P$:
C, 41.52; H, 5.58; N, 14.53.
Found: C, 41.78; H, 5.73; N, 15.21.

Following the same procedure, but substituting dimethyl phosphorochloridate, dipropyl phosphorochloridate, methyl isopropyl phosphorochloridate, and dibutyl phosphorochloridate for diethyl phosphorochloridate, there are prepared 0,0-dimethyl (3,6-dihydro-1,2-pyridazinedicarboximido)-phosphonate, 0,0-dipropyl (3,6-dihydro-1,2-pyridazinedicarboximido)phosphonate, 0-methyl-0-isopropyl (3,6-dihydro-1,2-pyridazinedicarboximido)phosphonate, and 0,0-dibutyl (3,6-dihydro-1,2-pyridazinedicarboximido)phosphonate, respectively.

EXAMPLE 3

Preparation of 0,0-diethyl-S-[(3,6-dihydro-1,2-pyridazinedicarboximido)methyl] phosphorothiolothionate.

PART A-1

N-hydroxymethyl-3,6-dihydro-1,2-pyridazinedi-carboximide

A solution consisting of 3.68 g. (24 millimole) 3,6-dihydro-1,2-pyridazinedicarboximide, 10 ml. of 37 percent aqueous formaldehyde, and 1.0 g. sodium hydroxide was heated at the reflux temperature for 45 min. before evaporating to dryness in a stream of dry air. The residue was first extracted with 250 ml. of boiling benzene and then with 200 ml. of hot chloroform. The extracts were combined and concentrated by removing the benzene and chloroform by evaporation. When the concentrate was cooled, a precipitate formed. The precipitate was collected on a filter and dissolved in chloroform. After filtering the solution and adding a small amount of technical hexane (Skellysolve B, a mixture of isomeric hexanes having a boiling range of 146° to 156° F.) there was obtained N-hydroxymethyl-3,6-dihydro-1,2-pyridazinedicarboximide having a melting point of 140.5° to 142° C.

Analysis
Calcd. for $C_7H_9N_3O_3$:
C, 45.90; H, 4.95.
Found: C, 45.86; H, 5.12.

PART A-2

Alternative preparation of N-hydroxymethyl-3,6-dihydro-1,2-pyridazinedicarboximide.

A solution consisting of 153.1 g. (1.0 mole) 3,6-dihydro-1,2-pyridazinedicarboximide, 400 ml. of 37 percent aqueous formaldehyde, and 2 ml. of 50 percent aqueous sodium hydroxide was heated on a steam bath until only solids remained. The solids were then dried at 45° C. under reduced pressure (about 0.070 atmosphere). The dried solids were dissolved in 1 l. chloroform, the solution was filtered, and the filtrate was concentrated to 600 ml. volume by evaporating the chloroform. After adding a small amount of technical hexane there was obtained 157.7 g. (85 percent yield) N-hydroxymethyl-3,6-dihydro-1,2-pyridazinedicarboximide having a melting point of 143.5° to 145° C.

PART B

N-chloromethyl-3,6-dihydro-1,2-pyridazinedicarboximide

To a solution of 4.2 ml. (0.058 mole) thionyl chloride in 30 ml. benzene that had been cooled to 7° C. was added 9.16 g. (0.050 mole) N-hydroxymethyl-3,6-dihydro-1,2-pyridazinedicarboximide (Part A-2 above). Mixing and stirring of the reaction mixture was continued for about 16 hrs. while the temperature was about 25° C. Any dissolved sulfur dioxide and hydrogen chloride were then removed by bubbling nitrogen gas through the mixture. The benzene was removed by evaporation, and the residue thus obtained was recrystallized from a mixture of benzene and technical hexane (five parts benzene: three parts technical hexane). There was thus obtained 4.27 g. N-chloromethyl-3,6-dihydro-1,2-pyridazinedicarboximide having a melting point of 117° to 118° C.

PART C 0,0-diethyl-S-[(3,6-dihydro-1,2-pyridazinedicarboximido)methyl]phosphorothiolothionate A reaction mixture prepared by adding a solution of 3.44 g. (16.9 millimoles) ammonium 0,0-diethyl-dithiophosphate in 15 ml. acetone to a solution of 3.40 g. (16.9 millimoles) N-chloromethyl-3,6-dihydro-1,2-pyridazinedicarboximide in 20 ml. acetone was heated at the reflux temperature for one hr. The solvent was then removed by evaporation under reduced pressure, and the residue was dissolved in benzene. The benzene solution was washed two times with water, washed once with saturated aqueous sodium chloride, and dried over anhydrous magnesium sulfate. The benzene was removed by evaporation under reduced pressure, and the residue was crystallized from 25 ml. ether at a temperature of −15° C. After two recrystallizations from 20 ml. volumes of ether, there was obtained 3.77 g. 0,0-diethyl-S-[(3,6-dihydro-1,2-pyridazinedicarboximido)methyl]phosphorothiolothionate having a melting point of 61° to 63° C.

Analysis:
Calcd. for $C_{11}H_{18}N_3O_4PS_2$:
C, 37.60; H, 5.16; P, 8.82; S, 18.25.
Found: C, 37.58; H, 5.02; P, 8.87; S, 18.97, 19.32.

EXAMPLE 4

Preparation of 0,0-diethyl 0-[(3,6-dihydro-1,2-pyridazinedicarboximido)methyli

Initial Method

A reaction mixture prepared by adding 50 ml. of 37 percent aqueous formaldehyde and 0.1 g. sodium hydroxide to 15.3 g. (0.10 mole) 3,6-dihydro-1,2-pyridazinedicarboximide was heated at reflux temperature for 15 min. The water and excess formaldehyde were then removed by evaporation on a steam bath. The residue was dissolved in 125 ml. benzene and the benzene solution was dried by azeotropic distillation (75 ml. benzene was removed). After adding 100 ml. chloroform, 7.0 g. (0.506 mole) potassium carbonate, and 17.3 g. (0.10 mole) diethyl phosphorochloridate to the dried benzene solution (50 ml.), this reaction mixture was held at 25° C. overnight with stirring and then heated at the reflux temperature for 2 hrs. The reaction mixture was filtered to remove solids, and the filtrate was evaporated to dryness under reduced pressure to give 26.15 g. 0,0-diethyl 0-[(3,6-dihydro-1,2-pyridazinedicarboximido)methyli Alternative Method A reaction mixture was prepared by adding 17.26 g. (0.10 mole) diethyl phosphorochloridate to a solution of 18.32 g. (0.10 mole) N-hydroxymethyl-3,6-dihydro-1,2-pyridazinedicarboximide in 100 ml. methylene chloride and 14.0 ml. (0.10 mole) triethylamine. The reaction mixture was held at 25° C. overnight, with continuous stirring. It was filtered, and the solvent was removed from the filtrate by evaporation under reduced pressure. There was thus obtained 28.4 g. (89 percent yield) of 0,0-diethyl 0-[(3,6-dihydro-1,2-pyridazinedicarboximido)methyli faintly yellow oil.

EXAMPLE 5

Preparation of 0,0-diethyl (3,4,5,6-tetrahydro-1,2-pyridazinedicarboximido)phosphonate

PART A 3,4,5,6-tetrahydro-1,2-pyridazinedicarboximide

A quantity (15.0 gm., 0.1 mole) of 3,6-dihydro-1,2-pyridazinedicarboximide was dissolved in 100 ml. 1 N aqueous sodium hydroxide and the solution was diluted with 200 ml. water. After adding 1.5 gm. 10 percent palladium on charcoal, the aqueous alkaline solution was hydrogenated at a pressure of 50 p.s.i. (pounds per square inch) and at a temperature of 25° C. for 2 1/2 hrs. The reaction mixture was then filtered to remove the catalyst, and the filtrate was concentrated to a relatively small volume by evaporating the water under reduced pressure. The concentrate was acidified with concentrated hydrochloric acid. A precipitate that formed was collected on a filter and recrystallized from ethanol to give the 3,4,5,6-tetrahydro-1,2-pyridazinedicarboximide melting at 179° to 181° C.

Analysis:
Calcd. for $C_6H_9N_3O_2$:
C, 46.44; H, 5.85; N, 27.08.
Found: C, 46.37; H, 5.97; N, 27.41.

PART B 0,0-diethyl (3,4,5,6-tetrahydro-1,2-pyridazine-dicarboximido)phosphonate.

A reaction mixture consisting of 15.5 g. (0.10 mole) 3,4,5,6-tetrahydro-1,2-pyridazinedicarboximide (Part A, above), 5.50 g. (0.102 mole) sodium methoxide, and 60 ml. methanol was heated to the reflux temperature. The methanol was removed by evaporation under reduced pressure, and the residue was dried at 60° C. under reduced pressure. The solid thus obtained was suspended in 60 ml. benzene and 17.5 g. (0.102 mole) 0,0-diethyl phosphorochloridate was added. After setting this reaction mixture aside for 8 days at 25° C. with stirring, the solids that had separated were removed by filtration and the filtrate was held under reduced pressure until all the benzene was removed. There was thus obtained 26.3 g. (90.4 percent yield) of 0,0-diethyl (3,4,5,6-tetrahydro-1,2-pyridazinedicarboximido)phosphonate.

EXAMPLE 6

Preparation of 0,0-diethyl (3,4,5,6-tetrahydro-4-methyl-1,2-pyridazinedicarboximido)phosphonate phonate.

PART A 3,6-Dihydro-4-methyl-1,2-pyridazinedicarboxamide

A reaction mixture consisting of 820 ml. isoprene, 312 g. azodicarbonamide, and 750 ml. dimethylformamide was heated at 100° C. with stirring for 24 hrs. in an autoclave. After cooling the reaction mixture was removed from the autoclave and the desired product was collected on a filter. The filter cake was dried and a portion was recrystallized from a mixture of dimethylformamide and water to give 3,6-dihydro-4-methyl-1,2-pyridazinedicarboximide having a melting point of 244° to 247° C. (with decomposition).

Analysis
Calcd. for $C_7H_{12}N_4O_2$:
C, 45.64; H, 6.57; N, 30.42.
Found: C, 45.72; H, 6.37; N, 30.65.

PART B 3,6-Dihydro-4-methyl-1,2-pyridazinedicarboximide
1. 3,6-dihydro-4-methyl-1,2-pyridazinedicarboxamide prepared in Part A, above, was suspended in 2.7 l. water and 362 g. sodium hydroxide was added. After heating and stirring this reaction mixture at 90° C. for 3 hrs., it was filtered. The filtrate was acidified with concentrated hydrochloric acid, and the precipitate that formed was recovered on a filter and washed with water. After drying in air, there was obtained 232 g. 3,6-dihydro-4-methyl-1,2-pyridazinedicarboximide having a melting point of 203° to 213° C. A portion recrystallized from water had the same melting point.

Analysis
Calcd. for $C_7H_{11}N_3O_2$:
C, 49.69; H, 6.55; N, 24.84.
Found: C, 50.01; H, 6.21; N, 25.10.

PART C 0,0-Diethyl (3,4,5,6-tetrahydro-4-methyl-1,2-pyridazinedicarboximido)phosphonate Following the procedure of Example 2, but substituting 3,4,5,6-tetrahydro-4-methyl-1,2-pyridazinedicarboximide for 3,6-dihydro-1,2-pyridazinedicarboximide, there is prepared 0,0-diethyl (3,4,5,6-tetrahydro-4-methyl-1,2-pyridazinedicarboximido)phosphonate.

EXAMPLE 7

Part A

Following the procedure of Example 6, Part A, but substituting 2,3-dimethylbutadiene, 2-ethyl-1,3-butadiene, 2-isopropyl-1,3-butadiene, and 2-butyl-1,3-butadiene for isoprene, there are prepared 3,6-dihydro-4,5-dimethyl-1,2-pyridazinedicarboxamide, 3,6-dihydro-4-ethyl-1,2-pyridazinedicarboxamide, 3,6-dihydro-4-isopropyl-1,2-pyridazinedicarboxamide, and 3,6-dihydro-4-butyl-1,2-pyridazinedicarboxamide, respectively.

PART B

Following the procedure of Example 6, Part B, but substituting 3,6-dihydro-3,6-dimethyl-1,2-pyridazinedicarboxamide; 3,6-dihydro-3,6-dipropyl-1,2-pyridezinedicarboxamide; 3,6dihydro-3-butyl-1,2-pyridazinedicarboxamide; 3,6-dihydro-3-ethyl-1,2-pyridazinedicarboxamide (all prepared by condensing the appropriate alkadiene with azodicarboxamide in accordance with the procedure described in U. S. Pat. No. 2,813,866); 3,6-dihydro-4,5-dimethyl-1,2-pyridazinedicarboxamide; 3,6-dihydro-4-ethyl-1,2-pyridazinedicarboxamide; 3,6-dihydro-4-isopropyl-1,2-pyridazinedicarboxamide; and 3,6-dihydro-4-butyl-1,2-pyridazinedicarboxamide (all prepared according to the procedure of Example 6, Part A) for 3,6-dihydro-4-methyl-1,2-pyridazinedicarboxamide, there are prepared 3,6-dihydro-3,6-dimethyl-1,2-pyridazinedicarboximide; 3,6-dihydro-3,6-dipropyl-1,2-pyridazinedicarboximide; 3,6-dihydro-3-butyl-1,2-pyridazinedicarboximide; 3,6-dihydro-3-ethyl-1,2-pyridazinedicarboximide; 3,6-dihydro-4,5-dimethyl-1,2-pyridazinedicarboximide; 3,6-dihydro-4-ethyl-1,2-pyridazinedicarboximide; 3,6-dihydro-4-isopropyl-1,2-pyridazinedicarboximide; and 3,6-dihydro-4-butyl-1,2-pyridazinedicarboximide, respectively.

PART C

Following the procedure of Example 6, Part C, but substituting 3,6-dihydro-3,6-dimethyl-1,2-pyridazinedicarboximide; 3,6-dihydro-3,6-dipropyl-1,2-pyridazinedicarboximide; 3,6-dihydro-3-butyl-1,2-pyridazinedicarboximide; 3,6-dihydro-3-ethyl-1,2-pyridazinedicarboximide; 3,6-dihydro-4,5-dimethyl-1,2-pyridazinedicarboxamide; 3,6-dihydro-4-ethyl-1,2-pyridazinedicarboxamide; 3,6-dihydro-4-isopropyl-1,2-pyridazinedicarboxamide; and 3,6-dihydro-4-butyl-1,2-pyridazinedicarboxamide for 3,6-dihydro-4-methyl-1,2-pyridazinedicarboximide, there are prepared 3,4,5,6-tetrahydro-3,6-dimethyl-1,2-pyridazinedicarboximide; 3,4,5,6-tetrahydro-3,6-dipropyl-1,2-pyridazinedicarboximide; 3,4,5,6-tetrahydro-3-butyl-1,2-pyridazinedicarboximide; 3,4,5,6-tetrahydro-3-ethyl-1,2-pyridazinedicarboximide; 3,4,5,6-tetrahydro-4,5-dimethyl-1,2-pyridazinedicarboximide; 3,4,5,6-tetrahydro-4-ethyl-1,2-pyridazinedicarboximide; 3,4,5,6-tetrahydro-4-isopropyl-1,2-pyridazinedicarboximide; and 3,4,5,6-tetrahydro-4-butyl-1,2-pyridazinedicarboximide, respectively,

PART D

Following the procedure of Example 2, but substituting 3,6-dihydro-3,6-dimethyl-1,2-pyridazinedicarboximide; 3,6-dihydro-3,6-dipropyl-1,2-pyridazinedicarboximide; 3,6-dihydro-3-butyl-1,2-pyridazinedicarboximide; 3,6-dihydro-3-ethyl-1,2-pyridazinedicarboximide; 3,6-dihydro-4,5-dimethyl-1,2-pyridazinedicarboxamide; 3,6-dihydro-4-ethyl-1,2-pyridazinedicarboxamide; 3,6-dihydro-4-isopropyl-1,2-pyridazinedicarboxamide and 3,6-dihydro-4-butyl-1,2- pyridazinedicarboxamide for 3,6-dihydro-1,2-pyridazinedicarboximide, there are prepared 0,0-diethyl (3,4,5,6-tetrahydro-3,6-dimethyl-1,2-pyridazinedicarboximido)phosphonate; 0,0-diethyl (3,4,5,6-tetrahydro-3,6-dipropyl-1,2-pyridazinedicarboximido)phosphonate; 0,0-diethyl (3,4,5,6-tetrahydro-3-butyl-1,2-pyridazinedicarboximido)phosphonate; 0,0-diethyl (3,4,5,6-tetrahydro-3-ethyl-1,2-pyridazinedicarboximido)phosphonate; 0,0-diethyl (3,4,5,6-tetrahydro-4,5-dimethyl-1,2-pyridazinecarboximido)-phosphonate; 0,0-diethyl (3,4,5,6-tetrahydro-4-ethyl-1,2-pyridazinedicarboximido)phosphonate; 0,0-diethyl (3,4,5,6-tetrahydro-4-isopropyl-1,2-pyridazinedicarboximido)phosphonate; 0,0-diethyl (3,4,5,6-tetrahydro-4-butyl-1,2-pyridazinedicarboximido)phosphonate, respectively.

EXAMPLE 8

Preparation of 0,0-diethyl-S-[1-(3,6-dihydro-1,2-pyridazinedicarboximido)ethyl]hl phosphorothiolothionate Following the procedure of Example 3, Part C, but substituting N-(1-chloroethyl)-3,6-dihydro-1,2-pyridazinedicarboximide for N-chloromethyl-3,6-dihydro-1,2-pyridazinedicarboximide yields 0,0-diethyl-S-[1-(3,6-dihydro-1,2-pyridazinedicarboximido)ethyl]phosphorothiolothionate. The starting compound, N-(1-chloroethyl)-3,6-dihydro-1,2-pyridazinedicarboximide is prepared by dehydrating (e.g., with phosphorus pentoxide) N-(2-hydroxyethyl)-3,6-dihydro-1,2-pyridazinedicarboximide (prepared as in Part A of Example 9) to give N-vinyl-3,6-dihydro-1,2-pyradizinedicarboximide, which on mixing with gaseous hydrogen chloride yields the aforesaid starting compound.

EXAMPLE 9

Preparation of 0,0-diethyl-S-[2-(3,6-dihydro-1,2-pyridazinedicarboximido)ethyl]hl phosphorothiolothionate

PART A

N-(2-hydroxyethyl)-3,6-dihydro-1,2-pyridazinedicarboximide

An excess of ethylene bromohydrin (20 ml.) was added to a stirred solution of 35 g. (0.2 mole) of the sodium salt of 3,6-dihydro-1,2-pyridazinecarboximide in 150 ml. of methyl alcohol. After about 48 hours the solution was concentrated and the precipitate filtered off and recrystallized from methyl alcohol to give N-(2-hydroxyethyl)-3,6-dihydro-1,2-pyridazinedicarboximide having a melting point of 163° to 166° C.

Analysis

Calcd. for $C_8H_{11}N_3O_3$:

C, 48.72; H, 5.62; N, 21.31.

Found: C, 48.92; H, 5.91; N, 21.17.

PART B

N-(2-chloroethyl)-3,6-dihydro-1,2-pyridazinedicarboximide

Reacting the N-(2-hydroxyethyl)-3,6-dihydro-1,2-pyridazinedicarboximide (prepared in Part A) with thionyl chloride yields N-(2-chloroethyl)-3,6-dihydro-1,2-pyridazinedicarboximide.

PART C 0,0-Diethyl-S-[2-(3,6-dihydro-1,2-pyridazinedicarboximido)ethyl]phosphorothiolothionate Following the procedure of Example 3, Part C, but substituting N-(2-chloroethyl)-3,6-dihydro-1,2-pyridazinedicarboximide for N-chloromethyl-3,6-dihydro-1,2-pyridazinedicarboximide yields 0,0-diethyl-S-[2-(3,6-dihydro-1,2-pyridazinedicarboximido)ethyl]phosphorothiolothionate.

EXAMPLE 10

Following the procedure of Example 9, Part A, but substituting 3-bromopropyl alcohol, 4-bromobutyl alcohol and 3-bromobutyl alcohol for ethylene bromohydrin, there are prepared N-(3-hydroxypropyl)-3,6-dihydro-1,2-pyridazinedicarboximide, N-(4-hydroxybutyl)-3,6-dihydro-1,2-pyridazinedicarboximide, and N-(3-hydroxy-1-methylpropyl)-3,6-dihydro-1,2-pyridazinedicarboximide, respectively.

EXAMPLE 11

Following the procedure of Example 3, Part B, but substituting N-(3-hydroxypropyl)-3,6-dihydro-1,2-pyridazinedicarboximide, N-(4-hydroxybutyl)-3,6-dihydro-1,2-pyridazinedicarboximide, N-(3-hydroxy-1-methylpropyl)-3,6-dihydro-1,2-pyridazinedicarboximide for N-hydroxymethyl-3,6-dihydro-1,2-pyridazinedicarboximide, there are prepared N-(3-chloropropyl)-3,6-dihydro-1,2-pyridazinedicarboximide, N-(4-chlorobutyl)-3,6-dihydro-1,2-pyridazinedicarboximide, and N-(3-chloro-1-methylpropyl)-3,6-dihydro-1,2-pyridazinedicarboximide, respectively.

EXAMPLE 12

Following the procedure of Example 3, Part C, but substituting N-(3-chloropropyl)-3,6-dihydro-1,2-pyridazinedicarboximide, N-(4-chlorobutyl)-3,6-dihydro-1,2-pyridazinedicarboximide, and N-(3-chloro-1-methylpropyl)-3,6-dihydro-1,2-pyridazinedicarboximide for N-chloromethyl-3,6-dihydro-1,2-pyridazinedicarboximide, there are prepared 0,0-diethyl-S-[3-(3,6-dihydro-1,2-pyridazinedicarboximido)propyl]-phosphorothiolothionate,0,0-diethyl-S-[4-(3,6-dihydro-1,2-pyridazinedicarboximido)butyl]phophorothiolothionate, and 0,0-diethyl-S-[3-(3,6-dihydro-1,2-pyridazinedicarboximido-1-methyl-propyl]phosphorothiolothionate, respectively.

The new insecticidal and miticidal Formulas I and II 1,2-pyridazinedicarboximides of this invention can be used as the pure compounds; but for practical reasons, the compounds are preferably formulated as pesticidal compositions. More particularly, the new 1,2-pyridazinedicarboximides are preferably formulated with a diluent carrier. Many different kinds of dispersible diluent carriers are commonly used in the art. Such carriers may or may not include adjuvants.

For example, pesticidal compositions useful against insects which infest plants can be formulated as granulars, dusts, wettable powders, emulsifiable concentrates, aqueous dispersions, solutions, and flowable creams for application to insects, mites, objects, or a situs. Moreover, the new 1,2-pyridazinedicarboximides of Formulas I and II of the invention can be the sole active agent in a composition, or other insecticidal, miticidal, fungicidal, virucidal, bactericidal, or synergistic components may be included.

The 1,2-pyridazinedicarboximides of this invention can be readily formulated as dusts by grinding a mixture of the compounds and a pulverulent carrier in the presence of each other. Grinding is conveniently accomplished in a ball mill, a hammer mill, or by air-blast micronization. A suitable ultimate particle size is less than 60 microns. Preferably, 95 percent of the particles are less than 50 microns, and about 75 percent are 5 to 20 microns. Dusts of that degree of comminution are conveniently free-flowing and can be applied to inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing hydrophobic starches.

Dusts can also be prepared by dissolving a Formula I or II 1,2-pyridazinedicarboximide in a volatile solvent such as methylene chloride, mixing the solution with a pulverulent carrier and evaporating the solvent.

The proportions of pulverulent carrier and 1,2-pyridazinedicarboximide vary over a wide range depending upon the pests to be controlled and the conditions of treatment. In general, dust formulations can contain up to about 50 percent (on a weight basis) of the active ingredient. Dusts having as little as 0.001 percent of the active ingredient can be used, but a generally preferred proportion is from about 0.50 percent to about 20 percent of active ingredient.

The dispersible powder formulations of this invention are prepared by incorporating a surfactant in a dust composition prepared as described above. When about 0.1 percent to about 12 percent of a surfactant is incorporated in a dust, the dispersible powder thus obtained is particularly adapted for further admixture with water for spraying on inanimate matter and products, fruit trees, field crops, and soil. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10 percent to about 50 percent of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sultonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, X-171), e.g., about equal parts of sodium dodecylbenzene sulfonate and isooctylphenoxy polyethoxyethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1 percent or less. The dispersible powder compositions can be formulated with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X-100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | |
|---|---|
| Active ingredient | 25% |
| Isooctylphenoxy polyethoxy ethanol | 1% |
| Polymerized sodium salt of substituted benzoid long-chain sulfonic acid | 2% |
| Georgia Clay | 72% |

This formulation, when dispersed in water at the rate of 10 lbs. per 100 gals., gives a spray formulation containing about 0.3 percent (3000 ppm) active ingredient which can be applied to pests, plants or other pest habitats, or pest foods to control pests.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The compounds of this invention can be applied to insects, mites, objects, or a situs in aqueous sprays without a solid carrier. Such aqueous sprays are advantageous for certain types of spray equipment and conditions of application. They are also advantageous when uniform dispersions, homogeneous solutions, or other easily mixed aqueous sprays are desired.

Aqueous sprays without a solid carrier are prepared from concentrated solutions of the compounds of the invention in an inert organic solvent carrier. The inert organic solvent carrier may be one that is miscible or immiscible with water. The compounds that are somewhat soluble in water can be dissolved in a water miscible solvent carrier, e.g., ethanol and mixed with water to give homogeneous solutions. The compounds that are less soluble in water can be dissolved in a solvent carrier that is immiscible with water and the solution dispersed in water to give a uniform dispersion, e.g., an emulsion.

In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which 1,2-pyridazinedicarboximides are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects, mites, objects, or a situs.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5 percent by volume at temperatures of the order of 20° to 30 ° C.), for example, cyclohexanone, methyl propyl ketone, summer oils (a paraffinic, intermediate distillation fraction having a viscosity range from 40 to 85 seconds Saybolt and an unsulfonatable residue over 90 per cent), ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5 percent to about 50 percent by weight, preferably from about 10 percent to about 40 percent. A concentrate comprising 20 % (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20 percent concentrate mixed with 40 gals. of water provides about 1,200 ppm (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular compositions of this invention are convenient for application to soil when persistance is desired. Granulars are readily applied broadcast or by localized, e.g., in-the-row applications. The individual granules may be any desired size from 30 to 60 mesh up to 20 to 40 mesh, or even larger. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to insects, mites, objects, or situs will depend upon the species of pests to be controlled, the presence of absence of desirable living organisms, temperature conditions of treatment, and the method and efficiency of application. In general, pesticidal activity is obtained when the compounds are applied at concentrations of about 100 to about 6,000 ppm, preferably at concentrations of about 500 to about 4,000 ppm.

The compositions containing a 1,2-pyridazinedicarboximide according to the invention, can be applied to insects, mites, objects or situs by conventional methods. For example, an area of soil, a building, or plants can be treated by spraying wettable powder suspensions, emulsions, or solutions from power sprayers or from hand-operated knapsack sprayers. Dusts can be applied by power dusters, or by hand-operated dusters. Creams and ointment formulations can be applied to objects for prolonged protection from insects and mites.

It will of course be appreciated that the conditions encountered when applying the method and compositions of this invention to actual practice can vary widely. Included among the variables that may be encountered are the degree of infestation by pests, the particular pest to be controlled, the particular situs being treated, the age or degree of development of plants to be protected, the prevailing weather conditions, such as temperature, relative humidity, rainfall, dews, and so forth.

The novel compounds described herein are versatile pesticidal agents which can be employed for many purposes, e.g., in agriculture, in industry, etc.

The new compounds of Formulas I and II are effective pesticides that can be used to control invertebrate pests in agriculture, in industry, and around the home. The compounds have been found to be active against invertebrate animals of the Phylum Arthropoda, illustratively Class Insecta, for example, order Coleoptera, more specifically, the cotton boil weevil (Anthonomus grandis Boheman), the confused flour beetle (Tribolium confusum Jacquelin de Val), and the Mexican bean beetle (Epilachna varivestis Mulsant), order Diptera, more specifically, the housefly (Musca domestica Linnaeus), order Orthoptera, more specifically, the house cricket (Acheta domesticus Linnaeus), and the German cockroach (Blatella germanica Linnaeus), and order Lepidoptera, more specifically, the Southern armyworm (Prodenia eridania Cramer), and Class arachnida, for example, order Acarina, more specifically, the two-spotted spider mite (Tetranychus urticae Koch).

Efficacy of the compound of Formulas I and II against invertebrate pests has been demonstrated at concentrations of 1,000, 500, 100, 50, and even 10 ppm depending upon the specific insect or mite used. Some invetebrate animal pests will be more sensitive to the compounds than others, and others might be quite resistent. In general, the compounds of Formulas I and II are used at concentrations ranging from about 30 to about 6,000 ppm.

What is claimed is:

1. The compounds identified by the structural formulas

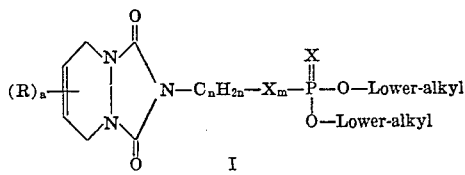

and

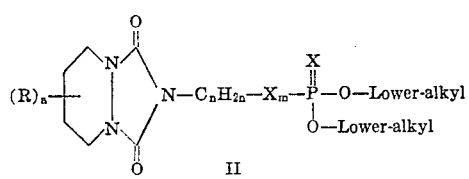

wherein R is lower-alkyl; $a$ is an integer from zero to four, inclusive; $n$ is an integer from zero to four, inclusive; $m$ is zero or one; and X is an oxygen or sulfur atom; provided that $m$ is one when $n$ is other than zero.

2. The compounds according to claim 1 wherein $m$ and $n$ are zero.

3. The 0,0-dialkyl-(1,2-pyridazinedicarboximido)-phosphonates according to claim 2.

4. The 0,0-dialkyl-(3,6-dihydro-1,2-pyridazinedicarboximido)phosphonates according to claim 3.

5. The compound 0,0-diethyl (3,6-dihydro-1,2-pyridazinedicarboximido)phosphonate according to claim 4.

6. The 0,0-dialkyl-(3,4,5,6-tetrahydro-1,2-pyridazinedicarboximido)phosphonates according to claim 3.

7. The compound 0,0-diethyl (3,4,5,6-tetrahydro-1,2-pyridazinedicarboximido)phosphonate according to claim 6.

8. The compound 0,0-diethyl (3,4,5,6-tetrahydro-4-methyl-1,2-pyridazinedicarboximido)phosphonate according to claim 6.

9. The 0,0-dialkyl (1,2-pyridazinedicarboximido)-phosphonothionates according to claim 2.

10. The 0,0-dialkyl (3,6-dihydro-1,2-pyridazinedicarboximido)phosphonothionates according to claim 9.

11. The compound 0,0-diethyl (3,6-dihydro-1,2-pyridazinedicarboximido)phosphonothionate according to claim 10.

12. The 0,0-dialkyl-X-[1,2-pyridazinedicarboximido)-methyl]phosphonates, phosphorothiolotionates, phosphorothionate, and phosphorothiolates according to claim 1.

13. The 0,0-dialkyl X-[(1,2-pyridazinedicarboximido)-methyl]phosphonates and phosphorothiolothionates according to claim 12.

14. The 0,0-dialkyl 0-[(1,2-pyridazinedicarboximido)-methyl]phosphonates according to claim 13.

15. The 0,0-dialkyl 0-[(3,6-dihydro-1,2-pyridazinedicarboximido)methyli cording to claim 14.

16. The compound 0,0-diethyl 0-[(3,6-dihydro-1,2-pyridazinedicarboximido)methyli ing to claim 15.

17. The 0,0-dialkyl S-[(1,2-pyridazinedicarboximido)-methyl]phosphorothiolothionates according to claim 13.

18. The 0,0-dialkyl S-[(3,6-dihydro-1,2-pyridazinedi-carboximido)methyl]phosphorothiolothionates according to claim 17.

19. The compound 0,0-diethyl S-[(3,6-dihydro-1,2-pyridazinedicarboximido)methyl]phosphorothiolothionate according to claim 18.

* * * * *